US007130085B2

(12) United States Patent
Ohara et al.

(10) Patent No.: US 7,130,085 B2
(45) Date of Patent: Oct. 31, 2006

(54) HALF-TONE DOT ELIMINATION METHOD AND SYSTEM THEREOF

(75) Inventors: Atsuko Ohara, Kawasaki (JP); Katsuhito Fujimoto, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1074 days.

(21) Appl. No.: 10/083,125

(22) Filed: Feb. 27, 2002

(65) Prior Publication Data
US 2003/0038975 A1    Feb. 27, 2003

(30) Foreign Application Priority Data
Aug. 23, 2001    (JP)    ............................ 2001-253294

(51) Int. Cl.
*G06F 15/00*    (2006.01)
*H04N 1/405*    (2006.01)

(52) U.S. Cl. ..................... 358/3.06; 358/3.26; 382/275

(58) Field of Classification Search ............... 358/3.06, 358/3.08, 3.26, 3.27; 382/168, 170, 178, 382/190, 194, 254, 264, 275
See application file for complete search history.

(56) References Cited

U.S. PATENT DOCUMENTS

| 5,572,602 A | 11/1996 | Naoi et al. |
| 5,729,635 A | 3/1998 | Fast et al. |
| 5,832,123 A * | 11/1998 | Oyamada ..................... 382/237 |
| 6,005,976 A | 12/1999 | Naoi et al. |
| 6,393,161 B1 * | 5/2002 | Stevenson et al. .......... 382/275 |

FOREIGN PATENT DOCUMENTS

| EP | 0 434 871 | 7/1991 |
| JP | 03122785 A * | 5/1991 |
| JP | 6-309498 | 11/1994 |
| JP | 9-50527 | 2/1997 |
| JP | 11134434 * | 5/1999 |

OTHER PUBLICATIONS

Nobuyuki Otsu, "A Threshold Selection Method from Gray-Level Histograms", IEEE Transaction on Systems, Man, and Cybernetics, vol. SMC-9, No. 1, Jan. 1979, pp. 62-66.
Su Liang et al., "A Morphological Approach to Text String Extraction From Regular Periodic Overlapping Text/Background Images", Proceedings ICIP-94 (Cat. No. 94CH35708) IEEE Comput. Soc. Press Los Alamitos, CA, USA, vol. 1, Sep. 1998, pp. 144-148.
Zhang Ping et al., "Document Filters Using Morphological and Geometrical Features of Characters", Image and Vision Computer Elsevier Netherlands, vol. 19, No. 12, Oct. 1, 2001, pp. 847-855.
Jaimes, A et al., "Segmentation and Automatic Descreening of Scanned Documents", Proceedings of the SPIE—The International Society for Optical Engineering SPIE-INT. Soc. Opt. Eng. USA, vol. 3648, Jan. 29, 1999, pp. 517-528.
Copy of European Search Report for corresponding application No. 02251265.1 dated Mar. 4, 2005.

* cited by examiner

*Primary Examiner*—Thomas D. Lee
(74) *Attorney, Agent, or Firm*—Staas & Halsey LLP

(57) ABSTRACT

After an original image, including half-tone dot meshed characters are inputted and a prescribed process is applied to the original image, black pixel connection patterns are extracted from a target process area. If the density of the extracted pattern exceeds prescribed density, it is judged that the pattern is half-tone dot meshed and both the respective average values and standard deviations of the vertical/horizontal sizes of the connection pattern are calculated. Then, respective threshold values are calculated based on both the respective average values and standard deviations, and half-tone dot patterns are eliminated. Furthermore, a pattern, the outline of which is long compared with an included black pixel, of all the remaining connection patterns is eliminated as an unnecessary pattern. Lastly, projections attached to a character are deleted and character extraction is terminated.

9 Claims, 7 Drawing Sheets

ORIGINAL IMAGE (a)

IMAGE OBTAINED BY ELIMINATING A HALF-TONE DOT, THE SIZE OF WHICH IS SMALLER THAN A SPECIFIC VALUE ACCORDING TO THE PRIOR ART (b)

IMAGE OBTAINED BY ELIMINATING BOTH HALF-TONE DOTS AND PROJECTIONS ACCORDING TO THE PREFERRED EMBODIMENT (c)

*1 ALTERNATIVELY, THE TROUGH OF THE HISTOGRAMS OF PATTERN SIZES CAN BE SET AS A THRESHOLD VALUE AND A PATTERN, THE SIZE OF WHICH IS SMALLER THAN THE THRESHOLD VALUE, CAN BE ELIMINATED.
*2 ALTERNATIVELY, PROJECTIONS CAN BE ELIMINATED BY A DEGRADATION PROCESS.

HALF-TONE DOT ELIMINATION METHOD AND SYSTEM THEREOF

BACKGROUND OF THE INVENTION

1. Field of the Invention

The present invention relates to a half-tone dot elimination method for accurately extracting characters from a half-tone dot meshed image in a character recognition device and the like, and a system thereof.

2. Description of the Related Art

Although the character recognition of a document is described below, the following technology generally relates to a technology for extracting characters from a half-tone dot meshed image in a broader sense, that is, not only in documents, but also in drawings. The present invention is not limited to a technology for extracting characters from half-tone dot meshed characters.

Recently, along with the spread of input devices, such as a scanner and the like, an opportunity to handle images has been increasing, and thereby, a demand for a character recognition equipment (or software) OCR has been increasing.

A conventional half-tone dot elimination method is described below.

Conventional Method 1

When extracting characters from an image, including a half-tone dot meshed area, conventionally a part with a high pattern density is detected and designated as a half-tone dot meshed area. However, since the area cannot be accurately recognized, characters in the half-tone dot meshed area cannot be recognized accurately and character recognition cannot be applied to the area as the half-tone dot meshed area is not a target of the character recognition.

Conventional Method 2

A pattern, the size of which is smaller than a specific value is deleted from a judged half-tone dot meshed area, based on a half-tone dot density and the like, and then character recognition is applied to the area.

According to conventional method 1, no character recognition can be performed. According to conventional method 2, since a pattern, the size of which is smaller than a specific value is deleted, a half-tone dot cannot be eliminated if the size of a half-tone dot varies. If half-tone dots overlap one another and the vertical/horizontal sizes become larger than the respective specific values too, the half-tone dots cannot be eliminated. Even if half-tone dots are eliminated, accurate character recognition cannot be performed due to character deformation caused by the overlapping of a half-tone dot on a character. Therefore, according the conventional method, if only the predetermined threshold value of a half-tone dot matches the size of a target half-tone dot and if only character deformation due to the overlapping of a half-tone dot on a character has no influence on character recognition, character recognition is possible. Otherwise, character recognition is impossible, which is a problem.

SUMMARY OF THE INVENTION

It is an object of the present invention to provide a half-tone dot elimination method for extracting characters suitable for character recognition and a system thereof.

The half-tone dot elimination method of the present invention eliminates half-tone dots from a half-tone dot meshed image. The method comprises specifying a half-tone dot meshed area based on the black pixel connection pattern density of a target area (meshed area specifying step) and eliminating a black pixel connection pattern, the size of which is smaller than a prescribed size, from the statistics on the black pixel connection pattern sizes of the half-tone dot meshed area (connection pattern elimination step).

The half-tone dot elimination system of the present invention eliminates half-tone dots from a half-tone dot meshed image. The system comprises a half-tone dot meshed area specifying unit specifying a half-tone dot meshed area based on the black pixel connection pattern density of a target area and a connection pattern elimination unit eliminating a black pixel connection pattern, the size of which is smaller than a prescribed size, from the statistics on the black pixel connection pattern sizes of the half-tone dot meshed area.

According to the present invention, a unique image, such as a character in a half-tone dot meshed area, can be extracted by effectively and efficiently eliminating half-tone dots. Therefore, if a character is extracted, a more accurate character recognition result can be obtained.

DESCRIPTION OF THE PREFERRED EMBODIMENT

According to the preferred embodiment of the present invention, a half-tone dot meshed area is detected in a document, based on pattern density and both half-tone dots and projections due to the overlapping of a half-tone dot on a character are eliminated. After extracting the half-tone dot meshed area, both the respective average values and standard deviations of the vertical/horizontal sizes of a pattern in the half-tone dot meshed area are calculated. Since the number of dot patterns in the half-tone dot meshed area is very large compared with the number of character patterns, both the respective average values and standard deviation value are influenced by both the size of a dot pattern and the dispersion of sizes. If the standard deviation is small, it is judged that the size dispersion of dot patterns is small and the size is almost constant, and a value obtained by adding a small value to the average value is used as a threshold value for distinguishing the character pattern from a dot pattern. If the standard deviation is large, it is judged that the size dispersion of dot patterns is large and a value obtained by adding a large value to the average value is used as the threshold value. Then, a dot pattern, the size of which is smaller than the obtained value is eliminated as a half-tone dot.

Alternatively, the histogram of all pattern sizes in a judged half-tone dot meshed area can be generated, the trough of the histogram can be set as a threshold value and a pattern, the size of which is smaller than the threshold value can be eliminated as half-tone dot patterns.

Even if a vertical/horizontal pattern size is large, the pattern is a noise due to the overlapping of half-tone dots if the pattern is thin compared with another character pattern or if black pixels are not concentrated and are dispersed. If the (outline length/number of black pixels) of each pattern exceeds a specific value, it is judged that such a half-tone dot is no character pattern and is eliminated.

Then, a projection due to the overlapping of a half-tone dot on a character is eliminated. A character pattern from which half-tone dots are eliminated is converted from a binary image into a gray image, and a gradation process is applied to the gray image. By gradating the gray image, fine projections are absorbed. Then, by converting the gradated gray image into a binary image again, the fine projections are eliminated.

Both the width and length of a projection to be eliminated are also estimated based on the eliminated half-tone dot size, and the projection is eliminated based on the estimation result.

For example, a case is shown where the cell of a document with a chart structure by ruled lines has half-tone dots. Any method is accepted as long as a cell area surrounded by ruled lines can be extracted from a document. For example, a method for extracting a ruled line from a document and extracting a cell surrounded by ruled lines four sides is described below.

Figure 1:
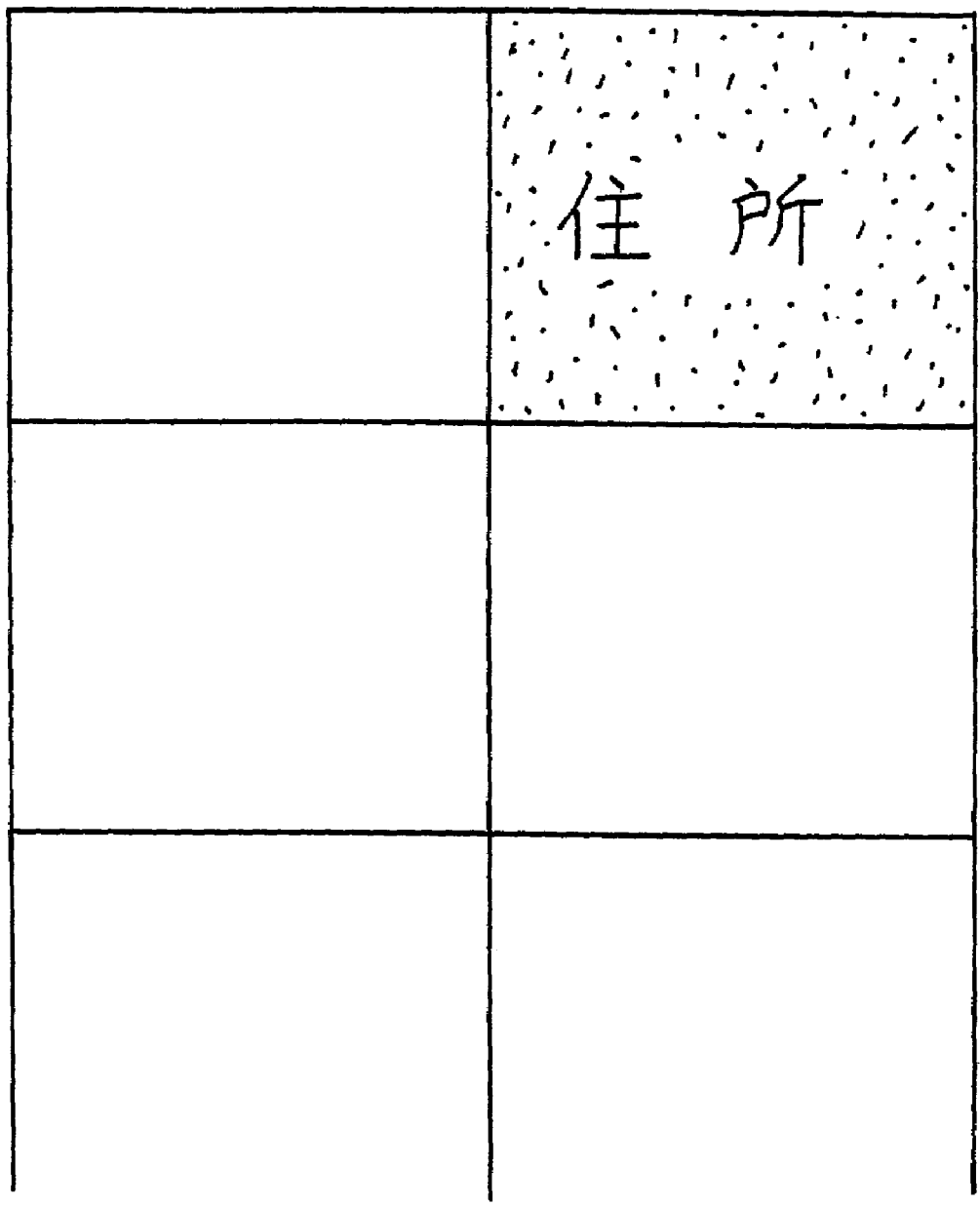
FIG. 1 shows an example of a document with a chart structure by ruled lines.

FIG. 1 shows an example of a document with a chart structure by ruled lines.

In FIG. 1, since the part of a chart in which "住 所", which is a Kanji word meaning an "address", is meshed by half-tone dots, a word (characters) "住 所" must be extracted from the meshed part. Note that "住" means residence and "所" means a place in Kanji word, and both are one character of Kanji, constructing in combination a meaning of "address". Hereinafter, appearance of both Kanji words in the description of the present invention and the drawings thereof should be realized that they represent an example of an image. In this case, a cell, including "住 所" is set as one process unit. Although in this example, the cell of a document with a chart structure is designated as one process unit, in a document with a structure other than a chart, an arbitrary process unit can be determined and the document can be processed in the units.

Input Image

An input image is a binary image without steep inclination. A condition of "without steep inclination" is set so that a chart can be easily detected and that a cell can be easily specified, and it has no direct relation with the main process of this preferred embodiment. Therefore, generally a simple binary image can be inputted.

Connection Pattern Extraction

A connection pattern extraction unit extracts an eight-connection pattern by labeling so that each pattern can be stably extracted regardless of the relative relation between the locations of a plurality of frames (see Japanese Patent Application No. 7-203259).

Mask Process

A mask process eliminates steep inclination from an image and transforms vertical/horizontal factors into thin lines so that a long straight line only located in a frame can be easily extracted. In order to accurately extract a straight-line factor candidate, a low-resolution image equivalent to 100 dpi is applied to the process (see Japanese Patent Application No. 7-203259).

Segment Extraction

This is a projection method for adding the projection value of a surrounding row or column to an adjacent projection value (the projection value of a specific row or column) of the masked image and designating the added value as a new projection value. In this way, surroundings can be seen in perspective (see Japanese Patent Application No. 5-103257). A straight line or a part of a straight line in a vertical/horizontal direction can be rectangularly approximated and detected. The same process is applied to both the vertical and horizontal directions. The image obtained by the mask process is applied to the process.

Straight Line Extraction

A long straight line is detected by uniting the neighborhood ones of all the segments that are extracted and rectangularly approximated by a segment extraction unit. The detected straight line is also rectangularly approximated (see Japanese Patent Application No. 7-203259).

Cell Extraction

Cells are extracted using the ruled line candidate selected in the process described above. Any method for extracting cells, which is an area surrounded by straight lines four sides, is accepted (see Japanese Patent Application No. 7-203259).

Half-tone Dot Elimination/elimination of Character Projections Due to Overlapping of Half-tone Dots This is the main process of this preferred embodiment. First, after extracting the cells, the judgment of a half-tone dot meshed area, the elimination of half-tone dots and the elimination of character projections due to the overlapping of half-tone dots are performed for each cell. In this case, a four-connection pattern is extracted, and both the size of each dot pattern and the number of such dot patterns are calculated. This is because even if the half-tone dots each belonging to a different dot pattern obliquely overlap one another, it can be recognized that each of the half-tone dots belongs to a different pattern and it cannot be recognized that the half-tone dots belong to the same dot pattern.

After extracting the cells, it is judged whether each cell includes a half-tone dot meshed area. If the density of the number of patterns, the sizes of which are smaller than a specific value in a cell, reaches or goes beyond a specific value, it is judged that the cell includes a half-tone dot meshed area. If the pattern density goes below the specific value, it is judged that the cell contains only character patterns. The pattern density is calculated as (number of patterns/cell area).

If it is judged that a cell includes half-tone dots, the half-tone dots are eliminated.

First, both the respective average values and standard deviations of the vertical/horizontal sizes of a pattern included in a cell are calculated. Since the number of dot patterns in a half-tone dot meshed area is very large compared with that of character patterns, both the respective average values and standard deviation values are influenced by both the size of a dot pattern and the dispersion of sizes. If the standard deviation is small, it is judged that the size dispersion of dot patterns is small, that the size is almost constant and that each half-tone dot size deviates little from the average value, and a value obtained by adding a small value to the average value is used as a threshold value for distinguishing a character pattern from a dot pattern. If the standard deviation is large, it is judged that the size dispersion of dot patterns is large and that a half-tone dot size sometimes deviates greatly from the average, and a value obtained by adding a large value to the average value is used as the threshold value. In this case, the threshold value can be expressed as threshold value=average value+standard deviation*α.

In the equation described above, α is assumed to be a constant. A pattern, the size of which is smaller than the obtained threshold value is eliminated as a half-tone dot pattern.

Alternatively, the histogram of all the pattern sizes in a judged half-tone dot meshed area can be generated, the trough of the histogram can be set as a threshold value and a pattern, the size of which is smaller than the threshold value can be eliminated as a half-tone dot pattern. The threshold value can be calculated by the same process as that of Otsu's binarization method used to binarize a grey level image, based on the histogram.

For Otsu's binarization, see the following literature.

N. Otsu, "A Threshold Selection Method from Grey level Histograms", IEEE Trans. Systems, Man, and Cybernetics, Vol. 9, No. 1, pp.62–66, 1979.

Even if the vertical/horizontal size of a pattern is large, the dot pattern can be eliminated if the pattern is thin compared with another character pattern or if black pixels are not concentrated and are dispersed, since the dot pattern is a noise due to the overlapping of half-tone dots. If the (outline length/number of black pixels) of each pattern exceeds a specific value, it is judged that such a half-tone dot is not a character pattern and is eliminated. If the (outline length/number of black pixels) is large, a pattern width becomes narrow. If the value is small, a pattern width becomes wide.

Figure 2:
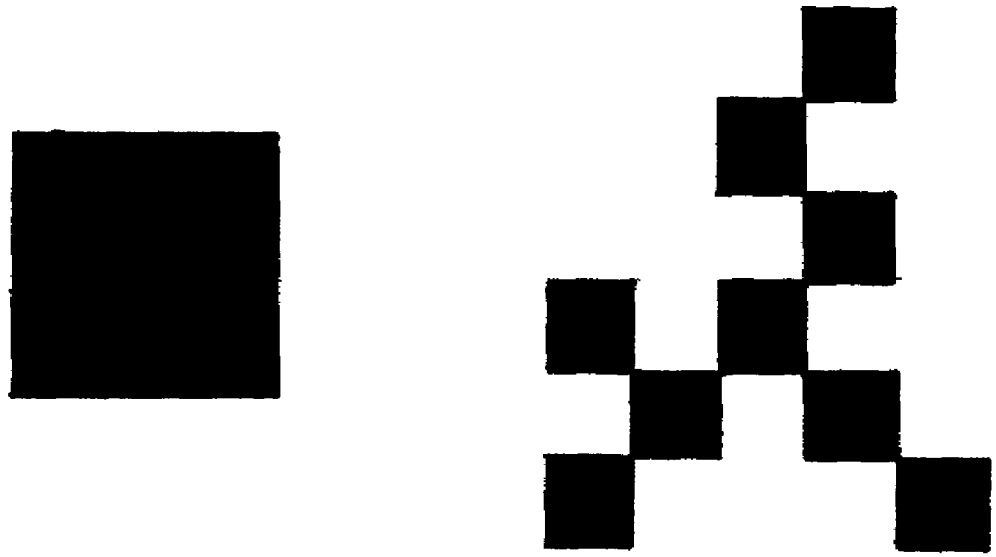
FIG. 2 shows the difference between a pattern size and an outline length.

FIG. 2 shows the difference between a pattern size and an outline length.

A pattern on the left and a pattern on the right are composed of the same number of black pixels (a pattern on the left and a pattern on the right have the same size). However, since the black pixels are concentrated in the left pattern, the outline of the left pattern is shorter than that of the right pattern. Since the pattern width of a character pattern is fairly wide compared with that of a half-tone dot pattern, (outline length/number of black pixels) becomes large and a character pattern can be distinguished from the half-tone dot pattern. Instead of an outline length, the side length of the circumscribed rectangle of a pattern can also be used. Noises other than a half-tone dot can also be eliminated.

The half-tone dot elimination method described above cannot eliminate half-tone dots overlapping a character, and a character pattern is deformed by projections due to the overlapping of half-tone dots. If character recognition is applied to such an image with projections, without performing any process, the recognition rate is reduced due to the character deformation. Therefore, such projections are eliminated and a character pattern is reshaped.

A character projection is small compared with the original shape of a character pattern. Therefore, the projections can be eliminated by gradating an image to such an extent that deformation due to projections can be absorbed. First, a target area is converted from a binary image into a grey image and a degradation process is applied to the image using a degradation filter, such as a Gaussian filter and the like. Then, by binarizing the image again, a pattern with no projection can be obtained.

Both the width and length of a character projection are also estimated based on the eliminated half-tone dot size and all the projections of the estimated size are eliminated.

Figure 3:
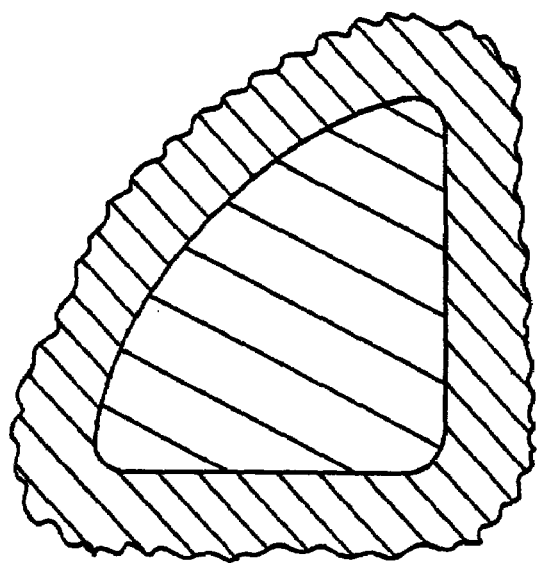
FIG. 3 shows the summary of a Gaussian filter operation.
Figure 3:
Figure 3:
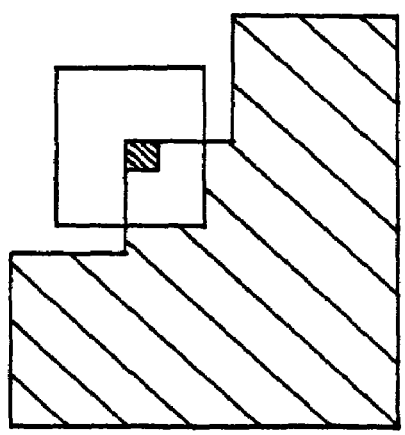

FIG. 3 shows the operational summary of a Gaussian filter.

If there is a pattern of black pixels shown on the left of FIG. 3, a Gaussian filter takes the average of density in the vicinity of each pixel included in the pattern and designates this value as the value of the relevant pixel. Since the value of a pixel around a pattern is the average of the value of the black pixel of the pattern and the pixel value of blank paper, the value becomes small and the color becomes grey, which is lighter than black. By repeating such a process, an image in which the inside of a pattern is black, but the surroundings are degraded grey can be obtained.

By applying such a process to a character to be extracted, both the shape and color of each projection attached around the character is degraded. Therefore, if the character is binarized again, the influence of projections can be reduced. In other words, as a result of the binarization, a clear character can be obtained.

Character Recognition

Lastly, character recognition is applied to the image obtained after eliminating both the half-tone dots and character projections due to the overlapping of half-tone dots for each cell, if requested. Character recognition is not always indispensable for this preferred embodiment. This is because if the data are stored as character data when half-tone dots are eliminated and a clear character is extracted without character recognition, the clear character can be obtained, for example, when the character is printed.

Figure 4:
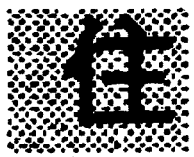
FIG. 4 shows the difference in a half-tone dot eliminating capability between this preferred embodiment and the prior art.
Figure 4:
Figure 4:

FIG. 4 shows the difference in half-tone dot elimination capability between this preferred embodiment and prior art.

FIG. 4A shows an original image, in which a Kanji character "所" is half-tone dot-meshed. FIG. 4B shows an image obtained by eliminating half-tone dots by the prior art adopting a method for eliminating a half-tone dot, the size of which is smaller than a specific value. As is clear from FIG. 4B, half-tone dots are not sufficiently eliminated and it is not always anticipated that when character recognition is applied to the character, a sufficient result can be obtained. However, according to this preferred embodiment described above, half-tone dots around the character "所" are completely eliminated and it is anticipated that when character recognition is applied to the character, a sufficient result can be obtained.

Figure 5:
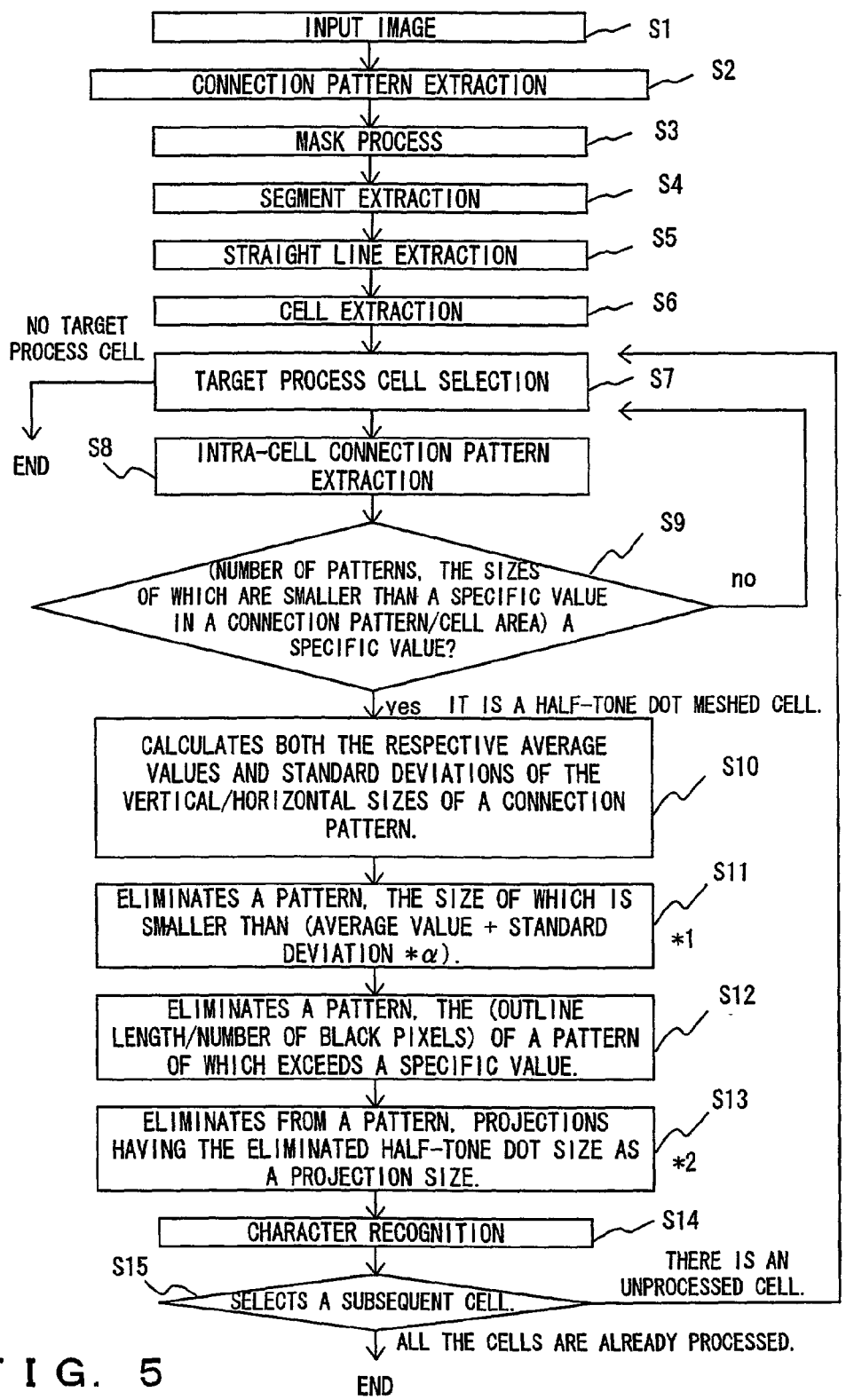
FIG. 5 is a flowchart showing the process flow of this preferred embodiment.

FIG. 5 is a flowchart showing the process flow of this preferred embodiment.

First, in step S1, an image is inputted. In step S2, a connection pattern is extracted from the input image. Then, in step S3, a mask process is applied to the image. In step S4, a segment is extracted. In step S5, a straight line is extracted. In step S6, a cell is extracted. Then, in step S7, a target process cell is selected. If it is judged that there is no process target cell, the process is terminated.

If a process target cell is determined, in step S8, an intra-cell connection pattern is extracted. In this case, four-connection patterns are extracted. Then, in step S9, it is judged whether (the number of patters, the size of which are smaller than a specific value, /cell area) in the connection pattern exceeds a specific threshold value. If the judgment is "no", the flow returns to step S7. If the judgment in step S9 is "yes", it is judged that the cell is a half-tone dot meshed cell and the flow proceeds to step S10.

In step S10, both the respective average values and standard deviations of the vertical/horizontal sizes of the connection pattern are calculated. In step S11, a pattern, the size of which is smaller than (average value+standard deviation*α (α is a constant)), is eliminated. In step S10, alternatively, the trough of the generated histogram of all the pattern sizes can be set as a threshold value and a pattern, the size of which is smaller than the threshold value, can be eliminated.

Then, in step S12, a pattern, both the outline length/number of black pixels in a connection pattern, the size of which is smaller than a specific value, exceeds a specific value, is eliminated. By the processes in steps S11 and 12, a lot of half-tone dots are eliminated. In step S13, projections with the eliminated half-tone dot size as a projection size are eliminated. In this way, projections are eliminated from a character pattern. However, in step S13, alternatively, projections can be eliminated by both a degradation process and a re-binarization process.

Then, in step S14, character recognition is applied to the image. In step S15, a subsequent cell is selected. If there is unprocessed cell, the flow returns to step S7. If all the cells are already processed, the process is terminated.

As described earlier, the character recognition process in step S14 is not an indispensable process in this preferred embodiment.

Figure 6:
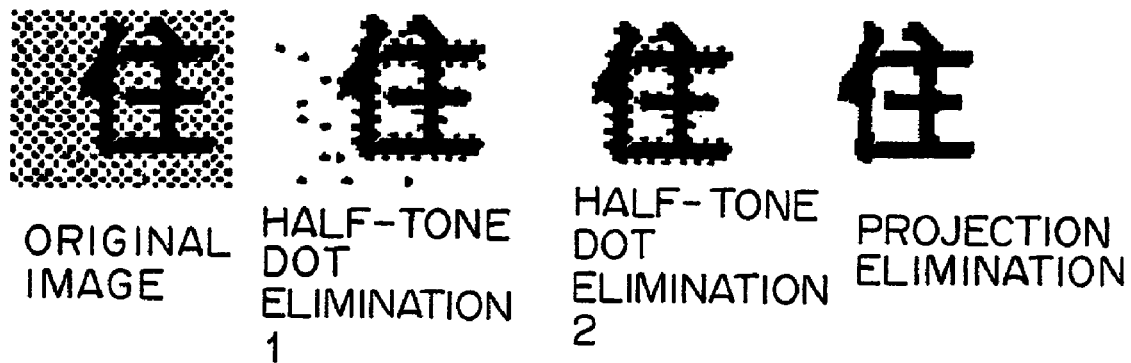
FIG. 6 shows half-tone dot elimination according to the half-tone dot elimination method of this preferred embodiment.

FIG. 6 shows the elimination of half-tone dots according to the half-tone dot elimination method of this preferred embodiment.

Both the average values (average sizes in the x and y axis directions, sizex_ave and sizey_ave, respectively, in the case where x and y axes are properly determined) and standard deviations (standard deviations, in the x and y axis directions, hx and hy, respectively) of the pattern size of an original image are calculated. Then, threshold values (threshold values in the x and y axis directions, thx=sizex_ave + hy and thy=sizey_ave+ hy, respectively) are calculated based on both the average values and standard deviations. If the vertical/horizontal length of each pattern is smaller than the threshold value (sizex<thx and sizey<thy), the pattern is judged to be a half-tone dot pattern and is eliminated. Half-tone dot elimination 1 shown in FIG. 6 shows an image after this process.

Then, patterns, the (outline length/number of black pixels) of which exceed a specific value, of all the patterns that are not eliminated, are eliminated. Half-tone dot elimination 2 shown in FIG. 6 shows an image after this process. Lastly, projections are eliminated by estimating a projection size based on the eliminated half-tone dot size (or by a degradation process). Projection elimination shown in FIG. 6 shows an image after this process.

As is seen from FIG. 6, by completely performing half-tone dot elimination according to this preferred embodiment, most of half-tone dots can be eliminated and a character suitable for character recognition can be extracted.

Figure 7:
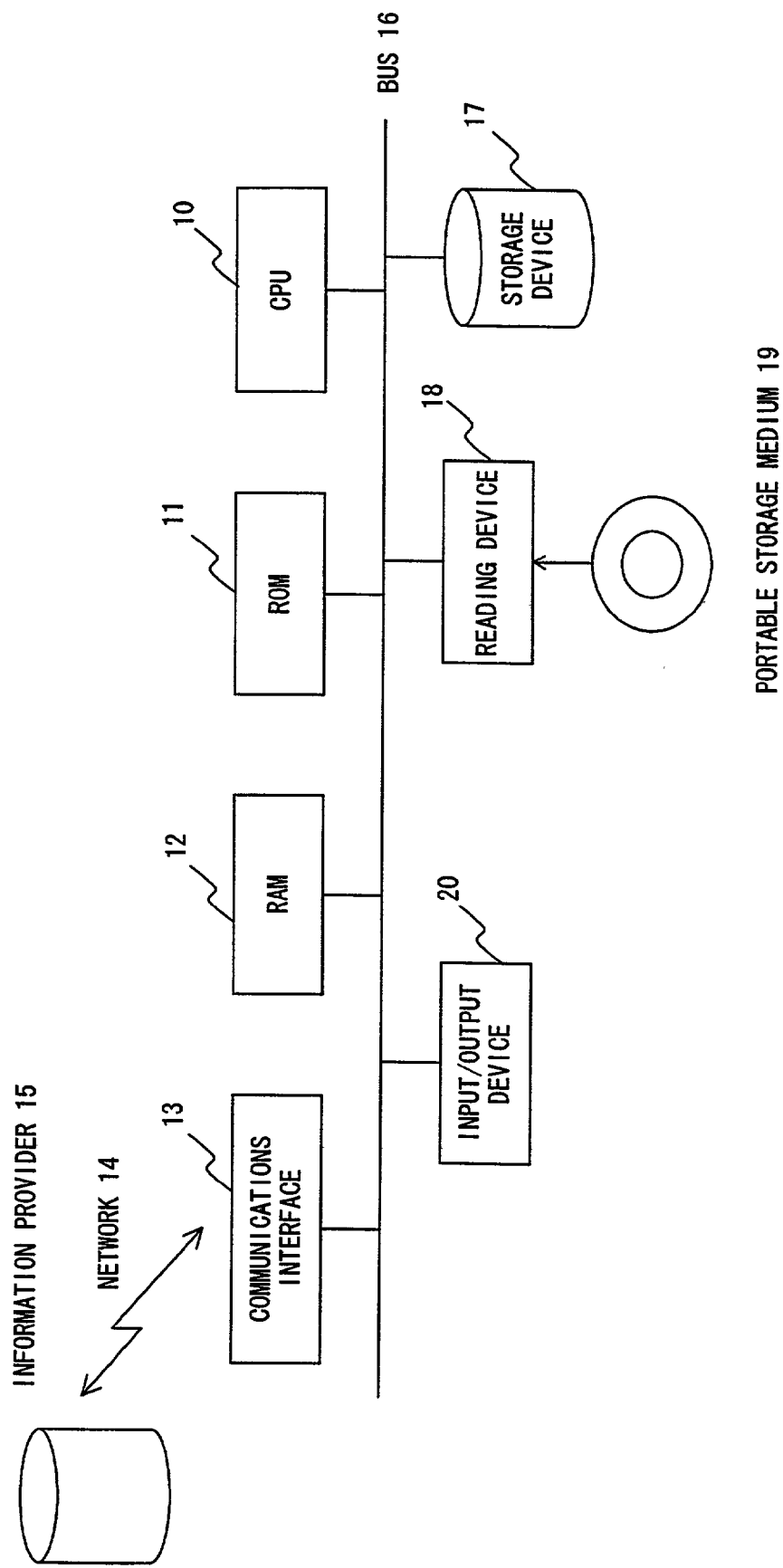
FIG. 7 shows the hardware environment of a computer that executes a program for enabling the computer to implement this preferred embodiment.

FIG. 7 shows the hardware environment of a computer that executes a program for enabling the computer to implement this preferred embodiment.

A CPU 10 is connected to a bus 61. The CPU 10 reads a program from ROM 11 or RAM 12 and executes the program. The program is usually stored in either a portable storage medium 19, such as a floppy disk, a CD-ROM, a DVD and the like or a storage device 17, such as a hard disk and the like. The program is read from either the portable storage medium 19 or storage device 17 by a reading device 18, is stored in the RAM 12 and is executed by the CPU 10.

An input/output device 20 is used to convey user's instructions to the CPU 10 through the bus 16 and to present the operation results of the CPU 10 to a user. The device 20 comprises a display, a keyboard, a mouse, a template and the like.

A communications interface 13 accesses the database of an information provider 15 through a network 14 and downloads the program to enable the CPU 10 to execute the program. Alternatively, the CPU 10 can execute the program in a network environment while being connected to the information provider 15.

As described above, according to the preferred embodiment of the present invention, a method for eliminating half-tone dot patterns from a monochrome binary image extracts a half-tone dot meshed area by pattern density, calculates the vertical/horizontal size of each pattern as means for eliminating small patterns and deletes a pattern, the size of which is smaller than a threshold value. Therefore, even if a half-tone dot size varies depending on an image, half-tone dots can be accurately eliminated.

When the (outline length/number of black pixels) of each pattern, which is used as means for eliminating half-tone dot patterns, exceeds a specific value, it is judged that the pattern is not a character pattern and the pattern is eliminated. By using the circumscribed rectangle size of a pattern in instead of the outline length, even if half-tone dots overlap one another and the circumscribed rectangle size becomes large, the pattern can be eliminated. In this case, a noise pattern, which is thin compared with a character pattern, can also be eliminated.

When the histogram of all the pattern sizes in a judged half-tone dot meshed area is generated as means for eliminating half-tone dot patterns, the trough of the histogram is set as the threshold value and a pattern, the size of which is smaller than the threshold value, can be eliminated. In this case too, even if a half-tone dot size varies depending on an image, the half-tone dots can be accurately eliminated.

When a monochrome binary image is converted into a grey image, a degradation process is applied to a character pattern using a degradation filter and character projections due to the overlapping of a half-tone dot on a character are eliminated by binarizing the degraded image again, the bad influence on character recognition can be reduced and thereby recognition accuracy can be improved.

When a projection size is estimated based on the eliminated half-tone dot size and character projections due to the overlapping of a half-tone dot on a character are eliminated from a pattern based on both the estimated width and length, the bad influence on character recognition can be reduced and thereby the recognition accuracy can be improved.

According to the present invention, half-tone dots can be effectively eliminated and a character suitable for character recognition can be efficiently extracted.

What is claimed is:

1. A half-tone dot elimination method for eliminating half-tone dots from a half-tone dot meshed image, comprising:

specifying a half-tone dot meshed area based on black pixel connection pattern density of a target process area; and eliminating a connection pattern, the size of which is smaller than a specific value, based on statistics on black pixel connection pattern sizes included in the half-tone dot meshed area, and wherein said connection pattern eliminating performs a process using a threshold value determined based on both an average value and standard deviation of a connection pattern size.

2. The half-tone dot elimination method according to claim 1, further comprising eliminating connection patterns, the (outline length/number of black pixels included in a connection pattern) exceeds a prescribed value, of all the connection patterns included in the half-tone dot meshed area.

3. The half-tone dot elimination method according to claim 2, wherein a side length of a circumscribed rectangle of a connection pattern is used for the outline length.

4. A half-tone dot elimination method for eliminating half-tone dots from a half-tone dot meshed image, comprising:

specifying a half-tone dot meshed area based on black pixel connection pattern density of a target process area; and eliminating a connection pattern, the size of which is smaller than a specific value, based on statistics on black pixel connection pattern sizes included in the half-tone dot meshed area, and wherein said connection pattern eliminating performs a process using a trough of a histogram of connection pattern sizes as a threshold value.

5. The half-tone dot elimination method according to claim 4, further comprising eliminating projections that are attached to an image except half-tone dots included in the half-tone dot meshed area.

6. The half-tone dot elimination method according to claim 5, wherein said projection elimination eliminates a projection, the size of which is smaller than a connection pattern size eliminated in said connection pattern elimination step.

7. The half-tone dot elimination method according to claim 5, wherein said projection elimination converts a binary image into a grey image, a degradation process is applied to the half-tone dot meshed area and the image after the degradation process is binarized again.

8. A half-tone dot elimination system for eliminating half-tone dots from a half-tone dot meshed image, comprising:

a meshed area specifying unit specifying a half-tone dot meshed area, based on black pixel connection pattern density of a target process area; and a connection pattern elimination unit eliminating a connection pattern, the size of which is smaller than a specific value, based on statistics on black pixel connection pattern sizes included in the half-tone dot meshed area, and wherein said connection pattern eliminating performs a process using a threshold value determined based on both an average value and standard deviation of a connection pattern size.

9. A computer readable medium storing a program for enabling a computer to implement a half-tone dot elimination method for eliminating half-tone dots from a half-tone dot meshed image, the method comprising:

specifying a half-tone dot meshed area, based on black pixel connection pattern density of a target process area; and eliminating a connection pattern, the size of which is smaller than a specific value, based on statistics on black pixel connection pattern sizes included in the half-tone dot meshed area, and wherein said connection pattern eliminating performs a process using a threshold value determined based on both an average value and standard deviation of a connection pattern size.

* * * * *